(12) United States Patent
Ohta

(10) Patent No.: US 8,773,382 B2
(45) Date of Patent: Jul. 8, 2014

(54) COMPUTER-READABLE STORAGE MEDIUM, COORDINATE PROCESSING APPARATUS, COORDINATE PROCESSING SYSTEM, AND COORDINATE PROCESSING METHOD

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 199 days.

(21) Appl. No.: 13/417,794

(22) Filed: Mar. 12, 2012

(65) Prior Publication Data

US 2013/0106729 A1    May 2, 2013

(30) Foreign Application Priority Data

Oct. 28, 2011  (JP) .................................. 2011-237854
Dec. 26, 2011  (JP) .................................. 2011-284428

(51) Int. Cl.
  *G06F 3/041*    (2006.01)
  *G06K 9/00*     (2006.01)
  *G06F 3/0488*   (2013.01)
(52) U.S. Cl.
  CPC ........ *G06F 3/04883* (2013.01); *G06K 9/00416* (2013.01)
  USPC .......................................... 345/173; 345/174
(58) Field of Classification Search
  None
  See application file for complete search history.

(56) References Cited

U.S. PATENT DOCUMENTS

| 8,239,785 | B2 | 8/2012 | Hinckley et al. |
| 8,279,184 | B2 | 10/2012 | Lowles et al. |
| 8,514,193 | B2 | 8/2013 | Chang et al. |

| 2004/0155871 | A1 | 8/2004 | Perski et al. |
| 2005/0093831 | A1 | 5/2005 | Wang |
| 2006/0267953 | A1 | 11/2006 | Peterson et al. |
| 2007/0024597 | A1 | 2/2007 | Matsuoka |
| 2008/0012838 | A1 | 1/2008 | Rimon |
| 2008/0170046 | A1 | 7/2008 | Rimon et al. |
| 2010/0073318 | A1* | 3/2010 | Hu et al. ........................ 345/174 |
| 2010/0110031 | A1 | 5/2010 | Miyazawa et al. |
| 2010/0271322 | A1 | 10/2010 | Kondoh et al. |
| 2010/0315361 | A1 | 12/2010 | Wang et al. |

(Continued)

FOREIGN PATENT DOCUMENTS

| JP | 2001-282449 | 10/2001 |
| JP | 2010-272100 | 12/2010 |

OTHER PUBLICATIONS

Oct. 31, 2013 Office Action in U.S. Appl. No. 13/417,931, 12 pages.
English language translation of JP 2001-282449, 5 pages.

(Continued)

*Primary Examiner* — Joseph Haley
(74) *Attorney, Agent, or Firm* — Nixon & Vanderhye P.C.

(57) ABSTRACT

A following coordinate which follows an input coordinate late is calculated. Then, an inference moving amount is calculated on the basis of a moving amount of an input coordinate, and an inference moving direction is calculated on the basis of a moving direction of the following coordinate. An inference movement vector is set on the basis of the inference moving amount and inference moving direction calculated thus. The following coordinate has low correlation with an actual moving amount of a finger of an operator, and the moving direction of the input coordinate has low correlation with an actual moving direction of the finger of the operator due to fluctuation of the input coordinate. Thus, the inference movement vector which is set as described above more accurately reflects the actual moving amount and moving direction of the finger of the operator.

16 Claims, 10 Drawing Sheets

(56) References Cited

U.S. PATENT DOCUMENTS

| | | |
|---|---|---|
| 2011/0205174 A1 | 8/2011 | Oh |
| 2012/0038580 A1 | 2/2012 | Sasaki |
| 2012/0050210 A1 | 3/2012 | King et al. |
| 2012/0127109 A1 | 5/2012 | Nishio et al. |
| 2012/0169623 A1 | 7/2012 | Grossman et al. |
| 2012/0229406 A1 | 9/2012 | Wu |
| 2013/0201155 A1 | 8/2013 | Wu et al. |

OTHER PUBLICATIONS

Ainsleigh et al. "Hidden Gauss-Markov Models for Signal Classification" IEEE Transactions on Signal Processing 50:1355-1367 (2000).

Bashir et al. "Object Trajectory-Based Activity Classification and Recognition Using Hidden Markov Models", IEEE Transactions on Image Processing 16:1912-1919 (2007).

Lai et al. "Neural Calibration and Kalman Filter Position Estimation for Touch Panels" Proceedings of the 2004 IEEE, International Conference on Control Applications, Taipei, Taiwan, Sep. 2-4, 2004.

Olwal et al. "Rubbing and Tapping for Precise and Rapid Selection on Touch-Screen Displays" Proceedings of CHI 2008 (SIGCHI Conference on Human Factors in Computing System), Florence, Italy, Apr. 5-10, 2008, pp. 295-304.

Office Action for U.S. Appl. No. 13/418,727, mailed Nov. 21, 2013.

\* cited by examiner

F I G. 1
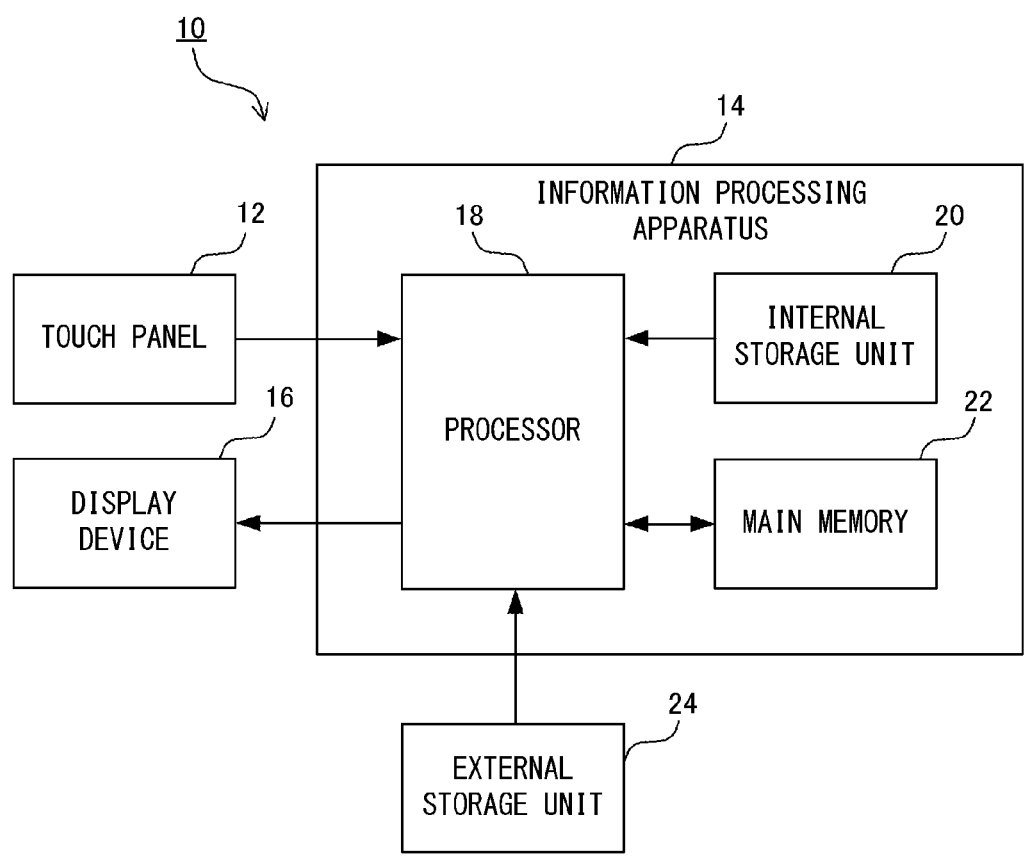

F I G. 2
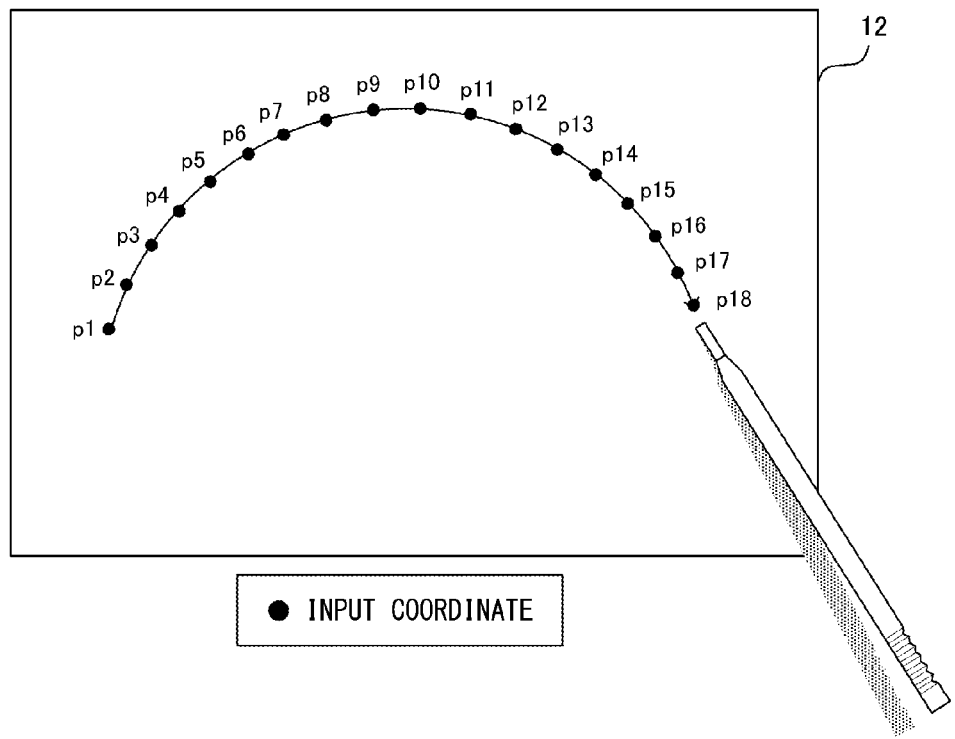
F I G. 3
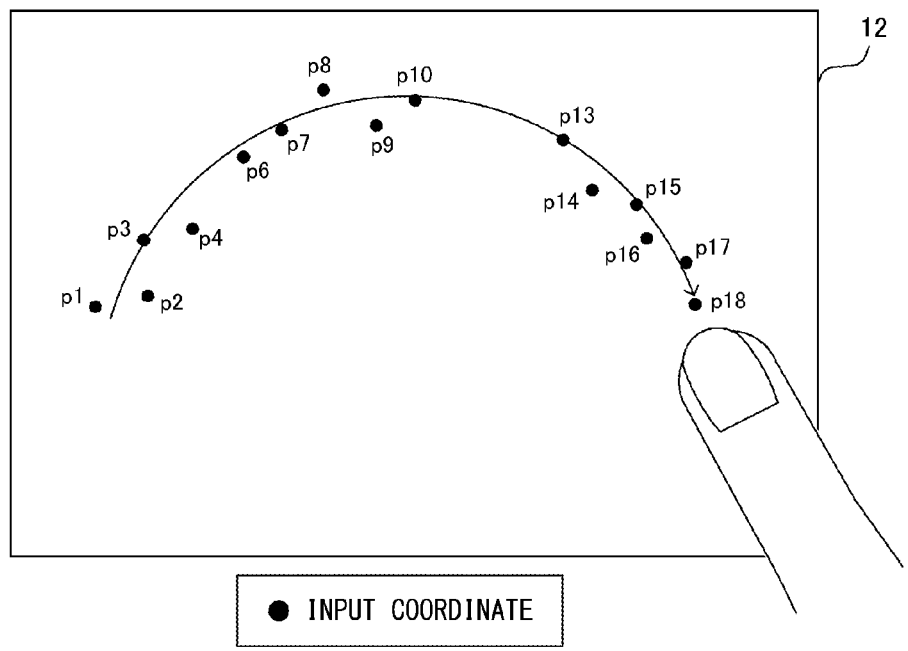

● INPUT COORDINATE  □ ALLOWANCE COORDINATE  ○ FOLLOWING COORDINATE

● INPUT COORDINATE  □ ALLOWANCE COORDINATE  ○ FOLLOWING COORDINATE

● INPUT COORDINATE    ○ FOLLOWING COORDINATE

● INPUT COORDINATE    ○ FOLLOWING COORDINATE

● INPUT COORDINATE  ○ FOLLOWING COORDINATE

● INPUT COORDINATE  ◇ AVERAGE COORDINATE

COMPUTER-READABLE STORAGE MEDIUM, COORDINATE PROCESSING APPARATUS, COORDINATE PROCESSING SYSTEM, AND COORDINATE PROCESSING METHOD

CROSS REFERENCE TO RELATED APPLICATION

The disclosures of Japanese Patent Application No. 2011-237854, filed on Oct. 28, 2011, and Japanese Patent Application No. 2011-284428, filed on Dec. 26, 2011, are incorporated herein by reference.

FIELD

The technology disclosed herein relates to a computer-readable storage medium, a coordinate processing apparatus, a coordinate processing system, and a coordinate processing method, and particularly relates to a computer-readable storage medium, a coordinate processing apparatus, a coordinate processing system, and a coordinate processing method for processing input coordinate data outputted from a coordinate input device.

BACKGROUND AND SUMMARY

Conventionally, there is technology to reduce fluctuation of coordinate data outputted from a coordinate input device such as a touch panel. For example, there is conventional technology in which weighted averaging of last corrected coordinate data and latest coordinate data is performed to generate latest corrected coordinate data.

However, the technology to reduce fluctuation of coordinate data has a fundamental demerit that responsiveness to an operation of an operator decreases. Thus, when the moving speed and the moving direction of the coordinate are calculated on the basis of the corrected coordinate data, the calculated moving direction substantially agrees with that of an actual input operation of the operator as a result of reduction of fluctuation of the coordinate data, but the calculated moving speed tends to diverge from that of the actual input operation of the operator due to decrease of the responsiveness.

It is a feature of the technology disclosed herein to provide a computer-readable storage medium, a coordinate processing apparatus, a coordinate processing system, and a coordinate processing method which can appropriately process input coordinate data outputted from a coordinate input device.

The feature described above is attained by, for example, the following configuration examples.

A first configuration example is a computer-readable storage medium having stored therein a coordinate processing program for processing input coordinate data outputted from a coordinate input device. The coordinate processing program causes a computer to operate as: a second coordinate series calculator configured to calculate, on the basis of a first coordinate series indicated by the input coordinate data, a second coordinate series which represents an input trajectory having a shape smoother than a shape of an input trajectory represented by the first coordinate series; a moving amount calculator configured to calculate a moving amount of a coordinate on the basis of the first coordinate series; a moving direction calculator configured to calculate a moving direction of the coordinate on the basis of the second coordinate series; and a processing section configured to perform predetermined processing by using the moving amount calculated by the moving amount calculator and the moving direction calculated by the moving direction calculator.

The "coordinate input device" may be any pointing device which is capable of outputting input coordinate data, and is typically a touch panel. The "second coordinate series" suffices to be any coordinate series which represents a shape smoother than the shape of the input trajectory represented by the first coordinate series, and, for example, a following coordinate which follows a target coordinate which is set on the basis of the input coordinate data may be calculated as a coordinate of the second coordinate series, or an average (an arithmetic average, a weighted average, or the like) of a plurality of coordinates included in the first coordinate series may be calculated as a coordinate of the second coordinate series.

The coordinate processing program can be stored in any computer-readable storage medium (e.g., a flexible disc, a hard disk, an optical disc, a magneto-optical disc, a CD-ROM, a CD-R, a magnetic tape, a semiconductor memory card, a ROM, a RAM, etc.).

The moving amount calculator may calculate the moving amount on the basis of at least a distance between a latest coordinate of the first coordinate series and a coordinate immediately previous to the latest coordinate.

Further, the moving direction calculator may calculate the moving direction on the basis of a direction of a straight line connecting a latest coordinate of the second coordinate series to a coordinate immediately previous to the latest coordinate.

Further, the second coordinate series calculator may calculate, as a coordinate of the second coordinate series, a following coordinate which follows a target coordinate which is set on the basis of the input coordinate data.

Further, the second coordinate series calculator may calculate, as a coordinate of the second coordinate series, a following coordinate which follows the target coordinate at a predetermined rate.

Further, the second coordinate series calculator may update the following coordinate at all times such that the following coordinate approaches the target coordinate by a predetermined rate of a distance from the following coordinate to the target coordinate.

Further, the target coordinate may be an allowance coordinate which, when being distant from an input coordinate indicated by the input coordinate data by more than a predetermined distance, moves toward the input coordinate so as to be located at a position away from the input coordinate by the predetermined distance.

Further, the processing section may include a movement vector generator configured to generate a movement vector indicating a moving amount and a moving direction of a coordinate, by using the moving amount calculated by the moving amount calculator and the moving direction calculated by the moving direction calculator.

Further, the processing section may include a third coordinate series calculator configured to calculate a third coordinate series by using the moving amount calculated by the moving amount calculator and the moving direction calculated by the moving direction calculator.

Further, the processing section may include a coordinate complementation section configured to complement the input coordinate data by using the moving amount calculated by the moving amount calculator and the moving direction calculated by the moving direction calculator, when output of the input coordinate data from the coordinate input device is temporarily interrupted.

Further, the processing section may perform the predetermined processing in real time in accordance with output of the input coordinate data from the coordinate input device.

A second configuration example is a coordinate processing apparatus for processing input coordinate data outputted from a coordinate input device. The coordinate processing apparatus comprises: a second coordinate series calculator configured to calculate, on the basis of a first coordinate series indicated by the input coordinate data, a second coordinate series which represents an input trajectory having a shape smoother than a shape of an input trajectory represented by the first coordinate series; a moving amount calculator configured to calculate a moving amount of a coordinate on the basis of the first coordinate series; a moving direction calculator configured to calculate a moving direction of the coordinate on the basis of the second coordinate series; and a processing section configured to perform predetermined processing by using the moving amount calculated by the moving amount calculator and the moving direction calculated by the moving direction calculator.

A third configuration example is a coordinate processing system for processing input coordinate data outputted from a coordinate input device. The coordinate processing system comprises: a second coordinate series calculator configured to calculate, on the basis of a first coordinate series indicated by the input coordinate data, a second coordinate series which represents an input trajectory having a shape smoother than a shape of an input trajectory represented by the first coordinate series; a moving amount calculator configured to calculate a moving amount of a coordinate on the basis of the first coordinate series; a moving direction calculator configured to calculate a moving direction of the coordinate on the basis of the second coordinate series; and a processing section configured to perform predetermined processing by using the moving amount calculated by the moving amount calculator and the moving direction calculated by the moving direction calculator.

A fourth configuration example is a coordinate processing method executed by a computer of a coordinate processing system for processing input coordinate data outputted from a coordinate input device. The coordinate processing method comprises the steps of: calculating, on the basis of a first coordinate series indicated by the input coordinate data, a second coordinate series which represents an input trajectory having a shape smoother than a shape of an input trajectory represented by the first coordinate series; calculating a moving amount of a coordinate on the basis of the first coordinate series; calculating a moving direction of the coordinate on the basis of the second coordinate series; and performing predetermined processing by using the calculated moving amount and the calculated moving direction.

According to the technology, it is possible to appropriately process input coordinate data outputted from a coordinate input device.

These and other objects, features, aspects and advantages of the technology will become more apparent from the following detailed description of non-limiting example embodiments when taken in conjunction with the accompanying drawings.

BRIEF DESCRIPTION OF THE DRAWINGS

FIG. 1 is a diagram showing a non-limiting example of a coordinate processing system;

FIG. 2 is a diagram showing a non-limiting example of input coordinates by a pen;

FIG. 3 is a diagram showing a non-limiting example of input coordinates by a finger;

DETAILED DESCRIPTION OF NON-LIMITING EXAMPLE EMBODIMENTS

Figure 4:
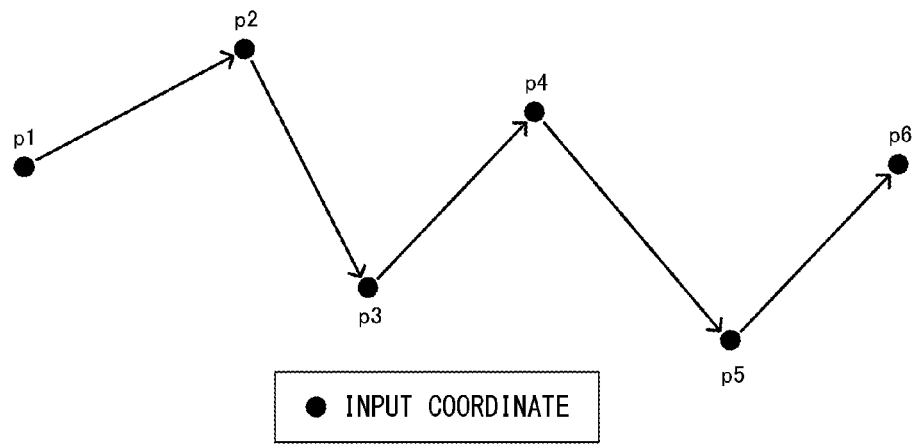
FIG. 4 is a diagram showing a non-limiting example of input coordinates.

In FIG. 1, a coordinate processing system 10 includes a touch panel 12, an information processing apparatus 14, a display device 16, and an external storage unit 24.

The touch panel 12 periodically detects a contact position of a finger or a pen with respect to an operation surface thereof and outputs coordinate data indicating the contact position, to the information processing apparatus 14 in predetermined cycles. In the exemplary embodiment, the touch panel 12 is a pressure-sensitive type.

The information processing apparatus 14 includes a processor 18, an internal storage unit 20, and a main memory 22. In the internal storage unit 20, computer programs which are to be executed by the processor 18 are stored. The internal storage unit 20 is typically a hard disk or a ROM (Read Only Memory). The main memory 22 temporarily stores computer programs and other data.

The display device 16 displays an image generated by the information processing apparatus 14, on a screen thereof. The touch panel 12 may be provided on the screen of the display device 16.

In the external storage unit 24, computer programs which are to be executed by the processor 18 are stored. The external storage unit 24 is typically a CD (Compact Disc), a DVD (Digital Versatile Disc), or a semiconductor memory.

It is noted that the configuration of the coordinate processing system 10 shown in FIG. 1 is a merely example, and in another embodiment, a coordinate processing system may be, for example, a hand-held game apparatus including a touch panel.

Next, an outline of coordinate processing executed in the coordinate processing system 10 will be described.

FIG. 2 shows a series of coordinates (input coordinates p1 to p18) detected by the touch panel 12 when an operator draws an arc on the operation surface of the touch panel 12 with a pen. When the touch panel 12 is operated with the pen as described above, almost no fluctuation and interruption of the input coordinate occur. Meanwhile, when the operator draws a similar arc on the operation surface of the touch panel 12 with a finger, fluctuation and interruption of the input coordinate occur as shown in FIG. 3. This is mainly due to the contact area of the finger with the operation surface being larger than that of the pen. In general, as a contact area with the operation surface at an input operation increases, fluctuation and interruption of the input coordinate is more likely to occur. This is because when the contact area increases, fluctuation of a detected contact position is likely to occur, and particularly in a pressure-sensitive type coordinate input device, the pressure on the operation surface per unit area decreases as the contact area increases, and thus it is likely to be erroneously determined that there is no contact, even when there is actually contact.

The information processing apparatus 14 performs processing for compensating for fluctuation and interruption of the input coordinate which are described above (coordinate correction processing). Specifically, the information processing apparatus 14 updates an "allowance coordinate" and a "following coordinate" in real time on the basis of an input coordinate inputted via the touch panel 12, to compensate for fluctuation and interruption of the input coordinate which are described above.

Hereinafter, a method for updating an allowance coordinate when input coordinates p1 to p6 are inputted as shown in FIG. 4 will be described with reference to FIG. 5.

When the initial input coordinate p1 is inputted, an allowance coordinate r1 is set so as to have the same values as those of the input coordinate p1.

Figure 5:
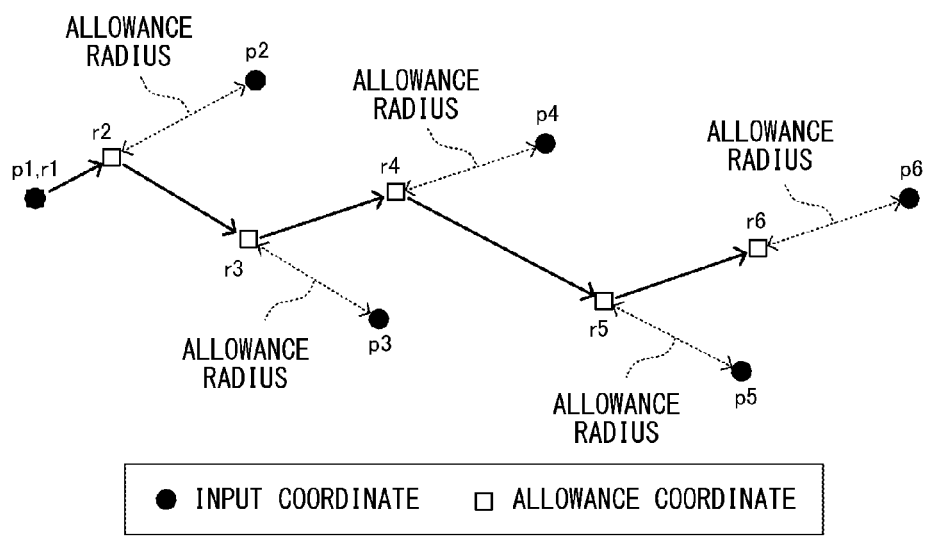
FIG. 5 is a diagram showing a non-limiting example of allowance coordinates which are set in accordance with input coordinates.

The allowance coordinate which is once set does not change while the distance therefrom to the latest input coordinate is equal to or less than a predetermined distance (an "allowance radius" shown in FIG. 5). Meanwhile, when the distance to the latest input coordinate is larger than the predetermined distance, the allowance coordinate changes so as to move toward the latest input coordinate such that the distance to the latest input coordinate agrees with the predetermined distance. It is noted that as described later, the allowance radius changes in response to a "finger degree" (a variable indicating a degree of likelihood of a finger) and, for example, in the range of 0 to 30.

In other words, when the input coordinate p2 is inputted, since the distance between the input coordinate p2 and the allowance coordinate r1 is larger than the allowance radius, the allowance coordinate moves toward the input coordinate p2 such that the distance therefrom to the input coordinate p2 agrees with the allowance radius. In this manner, an allowance coordinate r2 shown in FIG. 5 is set.

When the input coordinate p3 is inputted, since the distance between the input coordinate p3 and the allowance coordinate r2 is larger than the allowance radius, the allowance coordinate moves toward the input coordinate p3 such that the distance therefrom to the input coordinate p3 agrees with the allowance radius. In this manner, an allowance coordinate r3 shown in FIG. 5 is set.

After that, similarly, each time the input coordinates p4, p5, and p6 are inputted, allowance coordinates r4, r5, and r6 are sequentially set.

As is obvious from FIG. 5, an input trajectory represented by the allowance coordinates r1 to r6 is smoother than an input trajectory represented by the input coordinates p1 to p6, and fluctuation of the coordinate is suppressed.

Next, a method for updating a following coordinate when input coordinates p1 to p6 are inputted as shown in FIG. 4 will be described with reference to FIG. 6.

When the initial input coordinate p1 is inputted, a following coordinate f1 is set so as to have the same values as those of the input coordinate p1 (i.e., the same values as those of the allowance coordinate r1).

The following coordinate which is once set is updated so as to move toward the latest allowance coordinate by a predetermined rate (a "following rate" described later) of the distance therefrom to the latest allowance coordinate. It is noted that as described later, the following rate changes in response to the finger degree and, for example, in the range of 40% to 100%.

In other words, when the position of an allowance coordinate r2 is set, the following coordinate moves toward the allowance coordinate r2 by the predetermined rate (the following rate) of the distance between the allowance coordinate r2 and the following coordinate f1. In this manner, a following coordinate f2 shown in FIG. 6 is set.

When the position of an allowance coordinate r3 is set, the following coordinate moves toward the allowance coordinate r3 by the predetermined rate (the following rate) of the distance between the allowance coordinate r3 and the following coordinate f2. In this manner, a following coordinate f3 shown in FIG. 6 is set.

After that, similarly, each time allowance coordinates r4, r5, and r6 are set, following coordinates f4, f5, and f6 are sequentially set.

Figure 6:
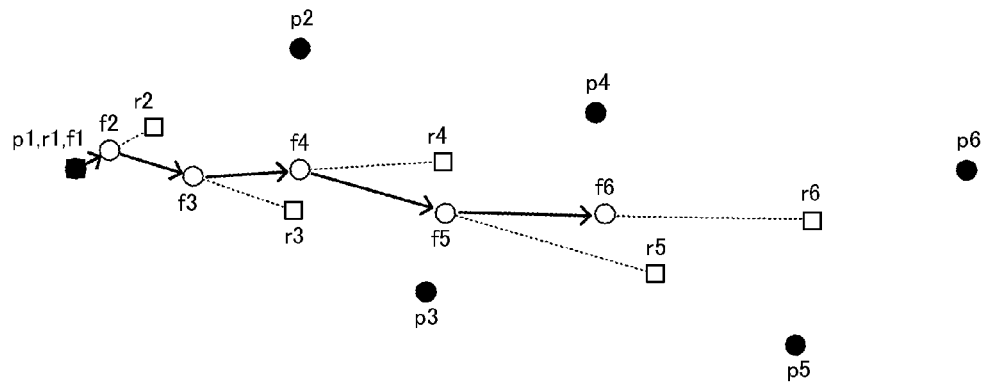
FIG. 6 is a diagram showing a non-limiting example of following coordinates which are set in accordance with the allowance coordinates.

As is obvious from FIG. 6, an input trajectory represented by the following coordinates f1 to f6 is smoother than the input trajectory represented by the allowance coordinates r1 to r6, and fluctuation of the coordinate is further suppressed.

It is noted that even when the input coordinate is temporarily interrupted, update of the allowance coordinate and the following coordinate is performed. A method for updating the allowance coordinate and the following coordinate when the input coordinate is temporarily interrupted will be described with reference to FIG. 7.

Figure 7:
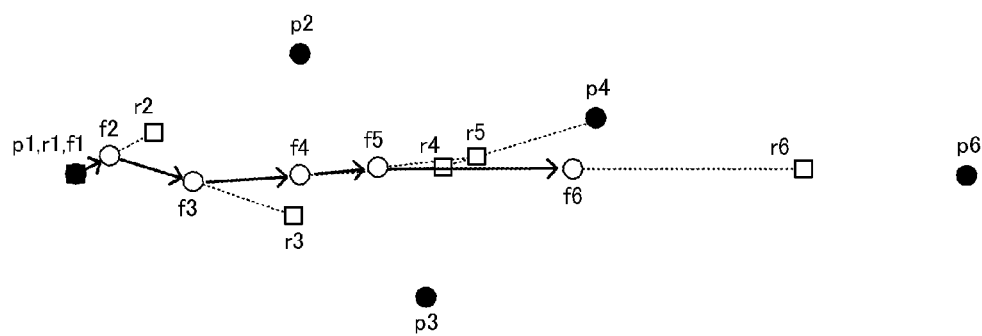
FIG. 7 is a diagram showing a non-limiting example of allowance coordinates and following coordinates when interruption of an input coordinate occurs.

FIG. 7 is the same as FIG. 5 and FIG. 6 in that each time input coordinates p1, p2, p3, and p4 are inputted, allowance coordinates r1, r2, r3, and r4 and following coordinates f1, f2, f3, and f4 are sequentially set.

In the example of FIG. 7, at a timing when an input coordinate p5 is to be inputted (hereinafter, referred to as timing t5), no input coordinate is inputted. Then, an input coordinate p6 is inputted. The allowance coordinate and the following coordinate are updated in predetermined cycles (e.g., in the same cycles as the cycles in which coordinate data is outputted from the touch panel 12), regardless of whether a valid input coordinate is inputted from the touch panel 12. Thus, at timing t5 as well, the allowance coordinate and the following coordinate are updated.

It is noted that in the exemplary embodiment, as described later, the allowance radius gradually decreases while no input coordinate is inputted (S22 in FIG. 12). Thus, at timing t5, the allowance coordinate slightly moves toward the latest input coordinate (i.e., the input coordinate p4) such that the distance therefrom to the input coordinate p4 agrees with the allowance radius which has slightly decreased. In this manner, an allowance coordinate r5 shown in FIG. 7 is set.

When the allowance coordinate r5 is set, the following coordinate moves toward the allowance coordinate r5 by the predetermined rate (the following rate) of the distance between the allowance coordinate r5 and the following coordinate f4. In this manner, a following coordinate f5 shown in FIG. 7 is set.

As described above, even when the input coordinate p5 is not inputted, the allowance coordinate r5 and the following coordinate f5 corresponding to the timing (timing t5) when the input coordinate p5 is to be inputted are set. Thus, even when the input coordinate is temporarily interrupted, interruption of the coordinate can be compensated for (i.e., a coordinate which is to be originally inputted can be complemented).

It is noted that in compensating for interruption of the coordinate, it has to be recognized whether the input coordinate is temporarily interrupted or the operator intentionally separates the finger or the pen from the operation surface of the touch panel 12. As a method for recognizing this, various methods are considered.

In the exemplary embodiment, while the following coordinate moves (more precisely, while a moving amount by which the following coordinate moves toward the latest allowance coordinate is larger than a predetermined amount), it is determined that the operator continues an input operation, and coordinate complementation is performed. Then, at a time when the following coordinate finally stops (more precisely, at a time when a moving amount by which the following coordinate moves toward the latest allowance coordinate becomes less than the predetermined amount), it is determined that the operator has ended the input operation. In this case, as the distance between the allowance coordinate and the following coordinate immediately before the input coordinate is interrupted increases, the period to the time when it is determined that the operator has ended the input operation increases.

In general, when the operator quickly slides the finger or the pen on the operation surface, the pressure on the operation surface is unstable as compared to that when the operator slowly slides the finger or the pen on the operation surface. Thus, interruption of the input coordinate is likely to occur. In addition, when the operator quickly slides the finger or the pen on the operation surface, the distance between the allowance coordinate and the following coordinate is large as compared to that when the operator slowly slides the finger or the pen on the operation surface. Thus, in the exemplary embodiment, when the operator quickly slides the finger or the pen on the operation surface, the period to the time when it is determined that the operator has ended the input operation is long as compared to that when the operator slowly slides the finger or the pen on the operation surface. Thus, interruption of the input coordinate can be effectively compensated for. Further, when the operator slowly slides the finger or the pen on the operation surface, the period to the time when it is determined that the operator has ended the input operation decreases. Thus, decrease of responsiveness can be suppressed. As a result, favorable operability is obtained for the operator.

Figure 8:
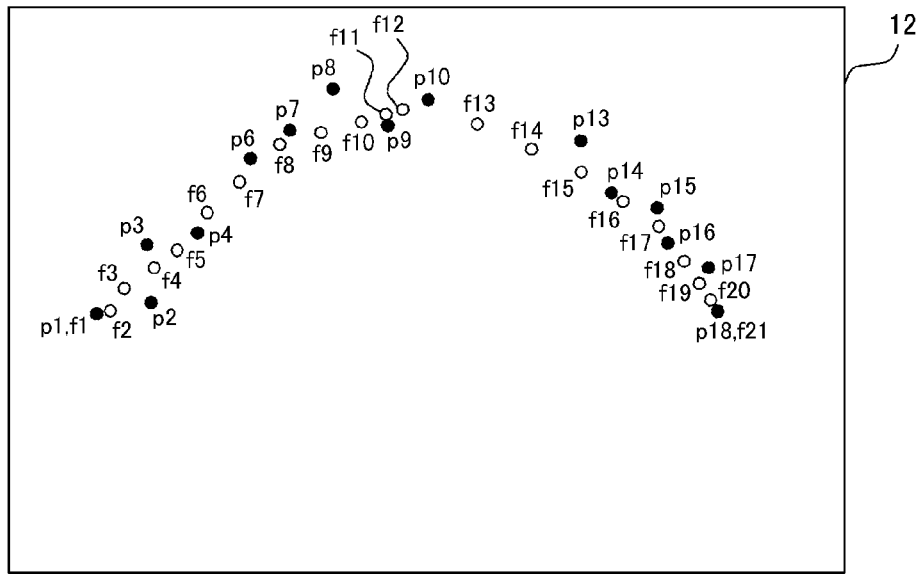
FIG. 8 is a diagram showing a non-limiting example of input coordinates by a finger and following coordinates corresponding to the input coordinates.

As a result of updating the allowance coordinate and the following coordinate for the input coordinates p1 to p4, p6 to p10, and p13 to p18 shown in FIG. 3 as described above, following coordinates f1 to f21 shown in FIG. 8 are obtained. As shown in FIG. 8, the following coordinate f1 coincides with the input coordinate p1, and the final following coordinate f21 substantially coincides with the input coordinate p18. In addition, an input trajectory represented by the following coordinates f1 to f21 is smoother than an input trajectory represented by the input coordinates p1 to p4, p6 to p10, and p13 to p18, and is closer to the original input trajectory. Moreover, complementation is performed with the following coordinates f5 and f11 to f12 corresponding to periods when the input coordinate is temporarily interrupted. Thus, favorable operability is obtained for the operator who operates the touch panel 12 with the finger.

Figure 9:
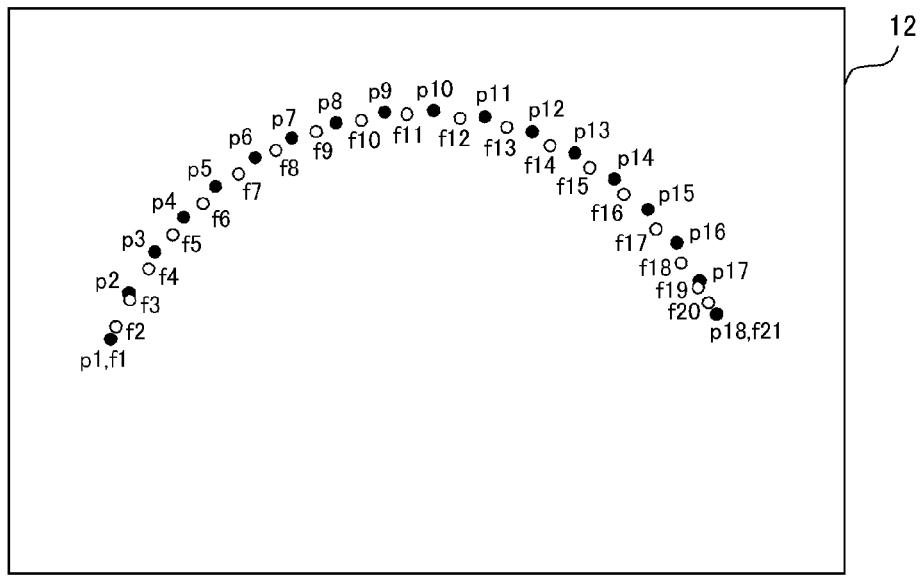
FIG. 9 is a diagram showing a non-limiting example of input coordinates by a pen and following coordinates corresponding to the input coordinates.

Meanwhile, when the allowance coordinate and the following coordinate are updated for the input coordinates p1 to p18 shown in FIG. 2 as described above, following coordinates f1 to f21 shown in FIG. 9 are obtained. However, in this case, there is no fluctuation and interruption of the input coordinate, and thus an input trajectory represented by the input coordinates p1 to p18 indicates a more accurate input trajectory than an input trajectory represented by the following coordinates f1 to f21 does. Further, as described above, the technology to reduce fluctuation of coordinate data has a fundamental demerit that responsiveness to an operation of an operator decreases, and thus, for example, the following coordinate f2 corresponding to the input coordinate p2 shifts from the input coordinate p2. The same applies to the following coordinates f3 to f18. Moreover, a timing when it is determined that the operator has ended the input operation becomes a timing later than the original timing (i.e., a timing when the input coordinate is interrupted), namely, a timing when the following coordinate stops moving.

Thus, in consideration of the demerit described above, when the operator operates the touch panel 12 with the pen as shown in FIG. 1, it is preferred not to correct the input coordinate rather than to compensate for fluctuation and interruption of the input coordinate. Thus, in the exemplary embodiment, a degree of compensating for fluctuation and interruption of the input coordinate is changed depending on whether the operator operates the touch panel 12 with the finger or the pen.

Specifically, when it is determined that the operator operates the touch panel 12 with the finger, the aforementioned allowance radius is increased and the aforementioned following rate is decreased, and when it is determined that the operator operates the touch panel 12 with the pen, the aforementioned allowance radius is decreased and the aforementioned following rate is increased. As the allowance radius is increased, the responsiveness to variation of the contact position decreases. Thus, fluctuation of the coordinate is further suppressed. Similarly, as the following rate is decreased, the responsiveness to variation of the contact position decreases. Thus, fluctuation of the coordinate is further suppressed. Therefore, not only when the operator operates the touch panel 12 with the finger but also when the operator operates the touch panel 12 with the pen, favorable operability is obtained for the operator.

It is noted that when it is determined that the operator operates the touch panel 12 with the pen, the allowance radius is set to 0 and the following rate is set to 100%, whereby the following coordinate completely coincides with the input coordinate. Then, when the input coordinate is interrupted, the following coordinate does not move at all, and thus at the time of the interruption of the input coordinate, it is immediately determined that the operator has ended the input operation.

As a method for determining whether the operator operates the touch panel 12 with the finger or the pen, various determination methods are considered. In the exemplary embodiment, whether the operator operates the touch panel 12 with the finger or the pen is not determined by making a choice between those two choices. For the determination, a variable (finger degree), which indicates a degree of likelihood of a finger and can be a value in the range of 0.0 to 1.0, is updated at all times in accordance with the shape of an input trajectory represented by input coordinates or a continuous contact time or continuous non-contact time indicated by input coordinates, and the allowance radius and the following rate are changed in response to the finger degree.

Meanwhile, as described with reference to FIG. 7, while the input coordinate is interrupted, the allowance coordinate gradually moves toward the latest input coordinate (i.e., the input coordinate inputted last), and the following coordinate moves toward the allowance coordinate. Thus, unless a new input coordinate is inputted, the moving speed of the following coordinate (i.e., the moving amount per one time) gradually decreases. This appears in the following coordinates f10 to f12 and the following coordinates f18 to f21 in FIG. 8.

However, in reality, the operator does not decrease or increase the moving speed of the finger during the input operation shown in FIG. 2. Thus, the moving speed of the following coordinate diverges from the moving speed of the finger of the operator. For that reason, in the exemplary embodiment, a method is also provided in which the actual moving amount (the moving amount per unit time) and the actual moving direction of the finger of the operator are inferred, and at least while the input coordinate is interrupted, the input coordinate is complemented by using a vector (inference movement vector) which is set on the basis of the inferred moving amount (inference moving amount) and the inferred moving direction (inference moving direction). Hereinafter, a coordinate which is set by using an inference movement vector as described above is referred to as "speed coordinate". It is thought that a speed coordinate more accurately reflects the actual speed of the finger of the operator as compared to the following coordinate.

As described above, the inference movement vector is a vector which is set on the basis of an inference moving amount and an inference moving direction. As is obvious from the above description, the following coordinate follows the input coordinate late, and thus the moving amount of the following coordinate has low correlation with the actual moving amount of the finger of the operator. Meanwhile, the moving direction of the input coordinate has low correlation with the actual moving direction of the finger of the operator, due to fluctuation of the input coordinate. Thus, in the exemplary embodiment, an inference moving amount is calculated on the basis of the moving amount of the input coordinate, and an inference moving direction is calculated on the basis of the moving direction of the following coordinate. As a result, it is thought that an inference movement vector which is set on the basis of the inference moving amount and inference moving direction calculated thus more accurately reflects the actual moving amount and moving direction of the finger of the operator.

Figure 10:
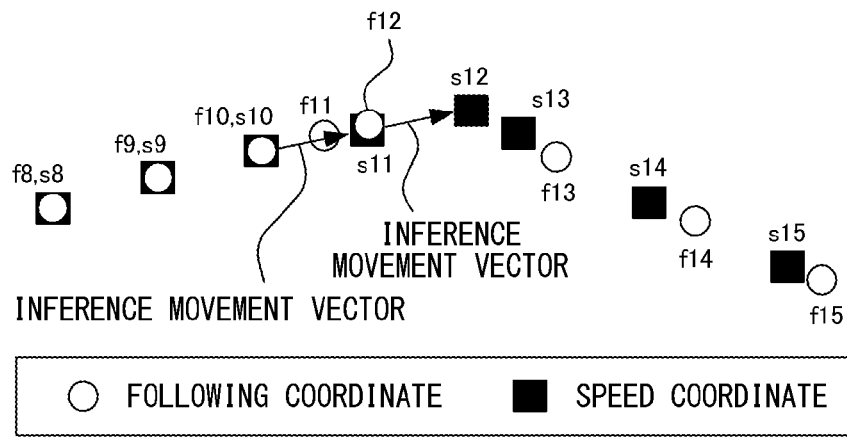
FIG. 10 is a diagram showing a non-limiting example of speed coordinates.

Hereinafter, a method for updating a speed coordinate when the input coordinates p1 to p4, p6 to p10, and p13 to p18 are inputted as shown in FIG. 3 will be described with reference to FIG. 10.

While input coordinates are inputted without interruption, the speed coordinate is basically updated so as to coincide with the following coordinate. Thus, speed coordinates s8 to s10 coincide with following coordinates f8 to f10, respectively.

While the input coordinate is interrupted, the speed coordinate is updated in accordance with an inference movement vector, independently of the following coordinate. In other words, at a timing when an input coordinate p11 is to be inputted, the speed coordinate moves in accordance with the inference movement vector which is set at that time. In this manner, a speed coordinate s11 shown in FIG. 10 is set. In addition, at a timing when an input coordinate p12 is to be inputted, the speed coordinate moves in accordance with the inference movement vector which is set at that time. In this manner, a speed coordinate s12 shown in FIG. 10 is set.

When input of the input coordinate is restarted, the speed coordinate sequentially moves toward the latest following coordinates, and finally coincides with the following coordinate again.

As described above, it is thought that the speed coordinate more accurately reflects the actual moving amount and moving direction of the finger of the operator particularly while the input coordinate is interrupted, as compared to the input coordinate and the following coordinate. Therefore, for example, when certain processing is performed on the basis of both the moving speed and the moving direction of the finger of the operator on the operation surface at a moment, more favorable operability is obtained for the operator by referring to the speed coordinate rather than by referring to the input coordinate and the following coordinate.

Next, an operation of the information processing apparatus 14 which executes the coordinate processing described above will be described with reference to FIGS. 11 to 13.

Figure 11:
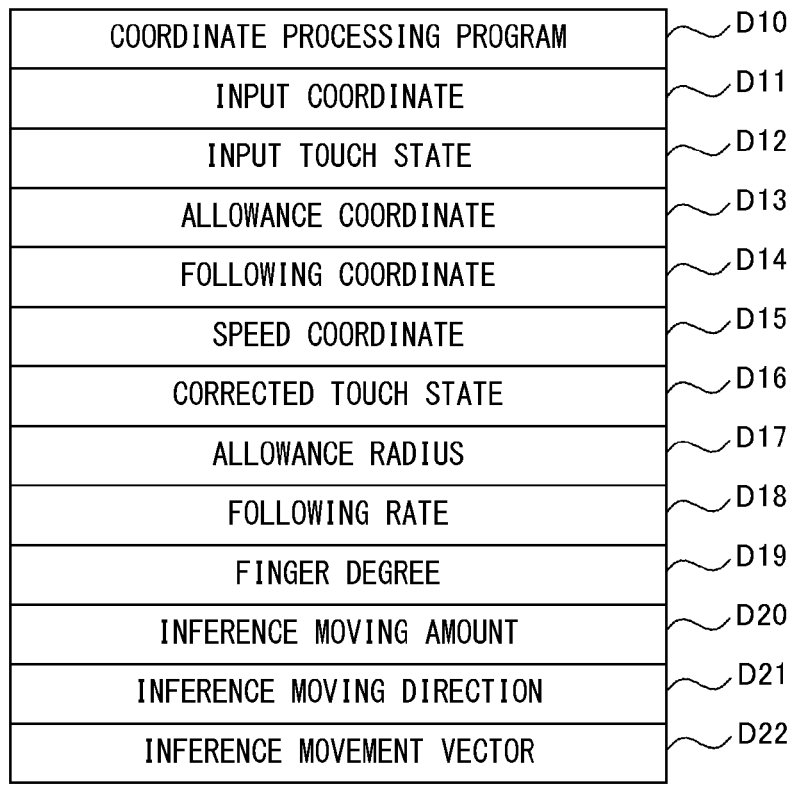
FIG. 11 is a diagram showing a non-limiting example of data stored in a RAM.

FIG. 11 shows an example of various data stored in the main memory 22 of the information processing apparatus 14 when the coordinate processing described above is executed.

A coordinate processing program D10 is a computer program for causing the processor 18 of the information processing apparatus 14 to execute the coordinate processing described above. The coordinate processing program D10 is read from the internal storage unit 20, the external storage unit 24, or the lke and loaded into the main memory 22.

An input coordinate D11 is data indicating an input coordinate outputted from the touch panel 12, and is typically two-dimensional coordinate values representing a contact position on the operation surface of the touch panel 12. In the exemplary embodiment, in the main memory 22, at least four input coordinates including a latest input coordinate inputted via the touch panel 12, an input coordinate inputted immediately before the latest input coordinate, an input coordinate inputted immediately before the last two input coordinates, and an input coordinate inputted immediately before the last three input coordinates, are stored.

An input touch state D12 is data which is outputted from the touch panel 12 and indicates whether the operation surface of the touch panel 12 is in a state of being touched (hereinafter, referred to as "touch-on state" or merely as "ON") or in a state of not being touched (hereinafter, referred to as "touch-off state" or merely as "OFF"). It is noted that in a certain type of touch panel, when the input coordinate D11 is invalid coordinate values, it can be determined that the input touch state is the touch-off state.

An allowance coordinate D13, a following coordinate D14, and a speed coordinate D15 are data indicating the aforementioned allowance coordinate, following coordinate, and speed coordinate, respectively, and each are typically two-dimensional coordinate values generated in real time on the basis of the input coordinate D11 inputted via the touch panel 12.

A corrected touch state D16 is obtained by reflecting a result of the aforementioned interruption compensation in the input touch state D12. In other words, even when the input touch state D12 temporarily becomes the touch-off state, the corrected touch state D16 is kept so as to be the touch-on state, if it is determined that the input operation of the operator is not interrupted (i.e., interruption of the input coordinate is temporary and touching of the operator on the operation surface actually continues).

An allowance radius D17 is a variable used for updating the allowance coordinate D13 as described above. In the exemplary embodiment, the allowance radius D17 can be a value in the range of 0.0 to 30.0.

A following rate D18 is a variable for updating the following coordinate D14 as described above. In the exemplary embodiment, the following rate D18 can be a value in the range of 40% to 100%.

A finger degree D19 is a variable indicating a degree of likelihood of a finger as described above. In the exemplary embodiment, the finger degree D19 can be a value in the range of 0.0 to 1.0.

An inference moving amount D20 is an actual moving amount (a moving amount per unit time) of the finger of the operator, which is inferred on the basis of a moving amount of the input coordinate D11, as described above.

An inference moving direction D21 is an actual moving direction of the finger of the operator, which is inferred on the basis of a moving direction of the following coordinate D14, as described above. The inference moving direction D21 is typically represented as a two-dimensional vector.

An inference movement vector D22 is a vector which is set on the basis of the inference moving amount D20 and the inference moving direction D21, and is typically a two-dimensional vector having a magnitude indicated by the inference moving amount D20 and a direction indicated by the inference moving direction D21.

Next, a flow of the coordinate processing executed by the processor 18 of the information processing apparatus 14 on the basis of the coordinate processing program D10 will be described with reference to flowcharts of FIGS. 12 and 13.

Figure 12:
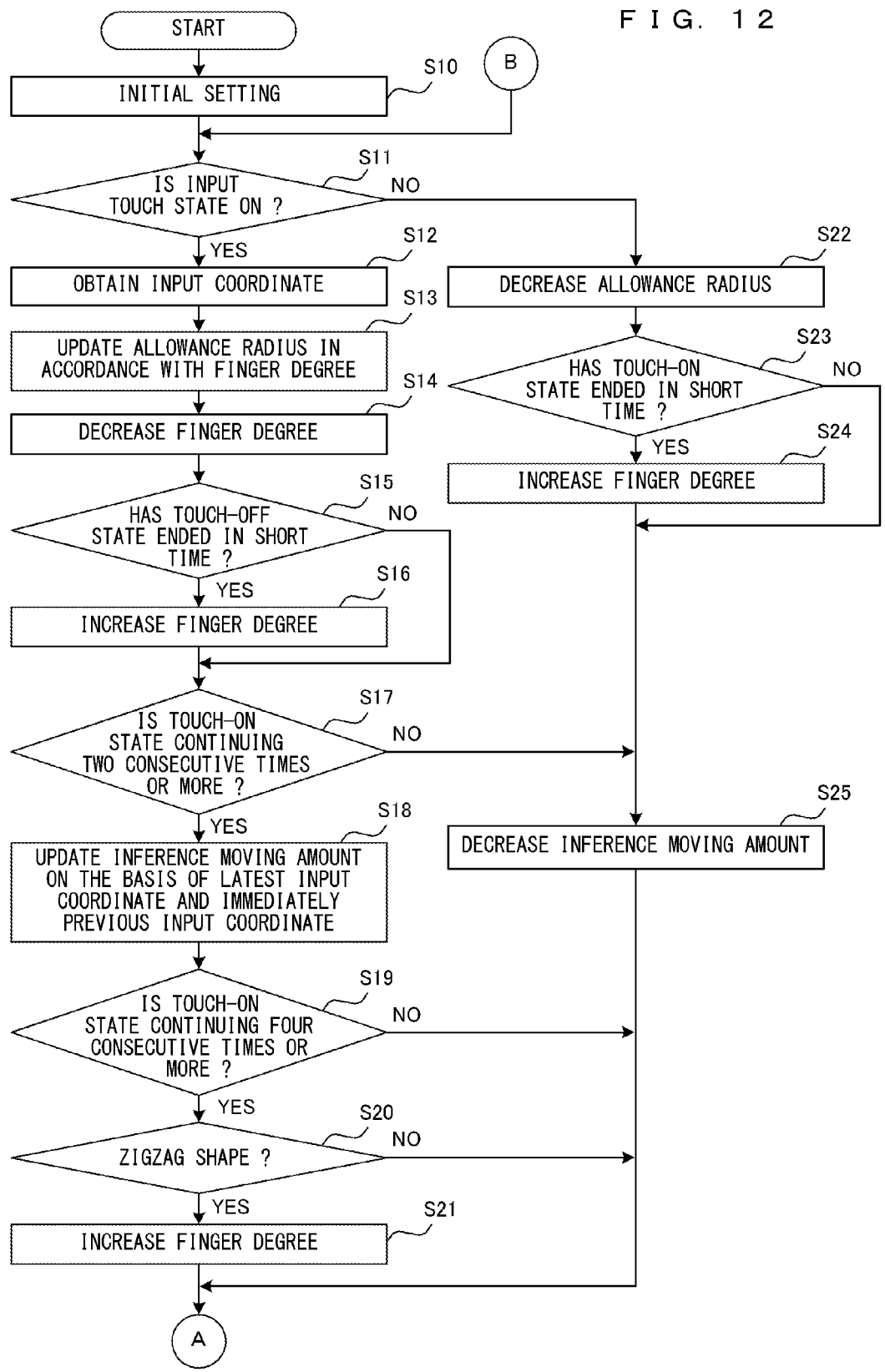
FIG. 12 is a non-limiting portion of a flowchart showing a flow of coordinate processing.

When execution of the coordinate processing program D10 is started, the processor 18 performs initial setting at step S10 in FIG. 12. In the initial setting, a process of setting each variable to an initial value, and the like are performed. For example, the finger degree D19 is set to 0.0, the allowance radius D17 is set to 0.0, and the following rate D18 is set to 100%.

At step S11, on the basis of a signal from the touch panel 12, the processor 18 determines whether the input touch state D12 is ON (in the touch-on state). Then, when the input touch state D12 is ON, the processing proceeds to step S12. When the input touch state D12 is not ON, the processing proceeds to step S22.

At step S12, on the basis of a signal from the touch panel 12, the processor 18 obtains the input coordinate D11.

Figure 14:
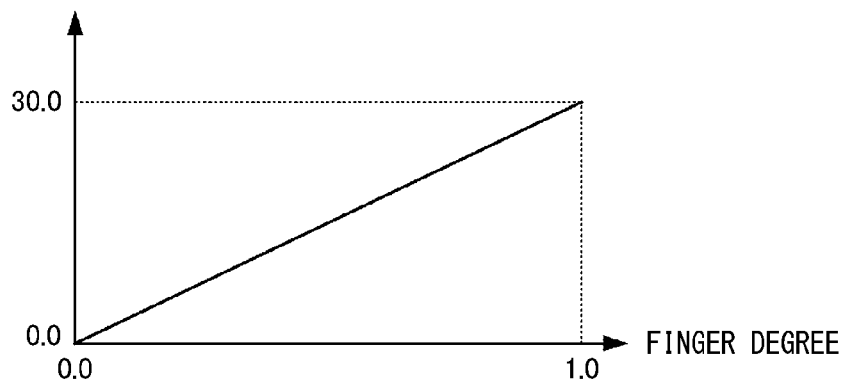
FIG. 14 is a diagram showing a non-limiting example of a method for calculating an allowance radius.

At step S13, the processor 18 updates the allowance radius D17 in accordance with the finger degree D19. Specifically, as the finger degree D19 increases (i.e., as the degree of likelihood of a finger increases), the processor 18 increases the allowance radius D17. For example, the processor 18 calculates the allowance radius D17 from the finger degree D19 by using a function shown in FIG. 14.

At step S14, the processor 18 decreases the finger degree D19. For example, the processor 18 multiplies the finger degree D19 by 0.98.

At step S15, the processor 18 determines whether the touch-off state has ended in a short time. Specifically, for example, the processor 18 counts the number of continuous times of the touch-off state of the input touch state D12 (i.e., a continuous non-contact time), and determines that the touch-off state has ended in a short time, if the number of continuous times is equal to or less than a predetermined number (e.g., 2) at the time when the input touch state D12 changes from the touch-off state to the touch-on state.

A situation where the touch-off state has ended in a short time as described above does not occur during a normal and appropriate input operation, and if such a situation occurs, there is the possibility that temporary interruption of the input coordinate has occurred due to an operation with the finger on the touch panel 12.

When it is determined that the touch-off state has ended in a short time, the processing proceeds to step S16. When it is not determined that the touch-off state has ended in a short time, the processing proceeds to step S17.

At step S16, the processor 18 increases the finger degree D19. Specifically, for example, the processor 18 adds a predetermined constant (e.g., 0.6) to the finger degree D19.

At step S17, the processor 18 determines whether or not the touch-on state is continuing two consecutive times or more. Specifically, for example, the processor 18 counts the number of continuous times of the touch-on state of the input touch state D12 (i.e., a continuous contact time), and determines whether the number of continuous times is equal to or more than 2. When it is determined that the touch-on state is continuing two consecutive times or more, the processing proceeds to step S18. When it is not determined that the touch-on state is continuing two consecutive times or more, the processing proceeds to step S25.

At step S18, the processor 18 updates the inference moving amount D20 on the basis of the latest input coordinate and the input coordinate immediately previous to the latest input coordinate. Specifically, for example, where the inference moving amount D20 before update is A; and the inference moving amount D20 after update is A'; and the distance between the latest input coordinate and the immediately previous input coordinate is B, it is satisfied that A'=A+(B−A)× C. C is a predetermined coefficient (e.g., 0.2). In another embodiment, the distance between the latest input coordinate and the immediately previous input coordinate may be set as the inference moving amount D20. In still another embodiment, an average (an arithmetic average, a weighted average, or the like) of the distance d1 between the latest input coordinate and the immediately previous input coordinate and the distance d2 between the immediately previous input coordinate and the input coordinate immediately previous to the last two input coordinates may be set as the inference moving amount D20.

At step S19, the processor 18 determines whether the touch-on state is continuing four consecutive times or more. Specifically, for example, the processor 18 counts the number of continuous times of the touch-on state of the input touch state D12 (i.e., a continuous contact time), and determines whether the number of continuous times is equal to or more than 4. When it is determined that the touch-on state is continuing four consecutive times or more, the processing proceeds to step S20. When it is not determined that the touch-on state is continuing four consecutive times or more, the processing proceeds to step S30 in FIG. 13.

Figure 15:
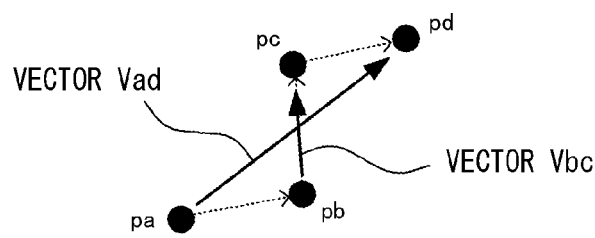
FIG. 15 is a diagram showing a non-limiting example of a method for determining a zigzag shape.

At step S20, the processor 18 determines whether the shape represented by the input coordinate D11 is a zigzag shape. Specifically, for example, the processor 18 determines whether or not the shape of an input trajectory represented by the last four input coordinates is a zigzag shape. For example, in FIG. 15, when an input coordinate pa, an input coordinate pb, an input coordinate pc, and an input coordinate pd are inputted in order, the processor 18 calculates an inner product of: a unit vector which is a vector Vad connecting the input coordinate pa to the input coordinate pd; and a unit vector which is a vector Vbc connecting the input coordinate pb to the input coordinate pc. Then, when the inner product is less than a predetermined value (e.g., 0.8), namely, when the angle formed between the line segment connecting the input coordinate pa to the input coordinate pd and the line segment connecting the input coordinate pb to the input coordinate pc is more than a predetermined angle, the processor 18 determines that the shape of the input trajectory represented by these four input coordinates pa to pd is a zigzag shape.

During a normal and appropriate input operation, the shape of the input trajectory represented by the last four input coordinates hardly becomes a zigzag shape. Thus, there is a high possibility that such a zigzag shape is caused by fluctuation of the input coordinate which occurs due to an operation with the finger on the touch panel 12.

In order to prevent an input trajectory from being determined as a zigzag shape by slight variation of a contact position in a state when the contact position almost does not move, for example, it may be determined that the input trajectory is not a zigzag shape, when the magnitude of at least either one of the vector Vad or the vector Vbc is equal to or less than a predetermined threshold.

When it is determined that the shape represented by the input coordinate D11 is a zigzag shape, the processing proceeds to step S21. When it is not determined that the shape represented by the input coordinate D11 is a zigzag shape, the processing proceeds to step S30 in FIG. 13.

At step S21, the processor 18 increases the finger degree D19. Specifically, for example, the processor 18 adds a predetermined constant (e.g., 0.6) to the finger degree D19. Then, the processing proceeds to step S30 in FIG. 13.

At step S22, the processor 18 decreases the allowance radius D17. For example, the processor 18 subtracts 3.0 from the allowance radius D17.

At step S23, the processor 18 determines whether the touch-on state has ended in a short time. Specifically, for example, the processor 18 counts the number of continuous times of the touch-on state of the input touch state D12 (i.e., a continuous contact time), and determines that the touch-off state has ended in a short time, if the number of continuous times is equal to or less than a predetermined number (e.g., 2) at the time when the input touch state D12 changes from the touch-on state to the touch-off state.

A situation where the touch-on state has ended in a short time as described above does not occur during a normal and appropriate input operation, and if such a situation occurs, there is the possibility that temporary interruption of the input coordinate has occurred due to an operation with the finger on the touch panel 12.

When it is determined that the touch-on state has ended in a short time, the processing proceeds to step S24. When it is not determined that the touch-on state has ended in a short time, the processing proceeds to step S25.

At step S24, the processor 18 increases the finger degree D19. Specifically, for example, the processor 18 adds a predetermined constant (e.g., 0.6) to the finger degree D19.

At step S25, the processor 18 decreases the inference moving amount D20. Specifically, for example, the processor 18 multiplies the inference moving amount D20 by 0.98. Then, the processing proceeds to step S30 in FIG. 13.

Figure 13:
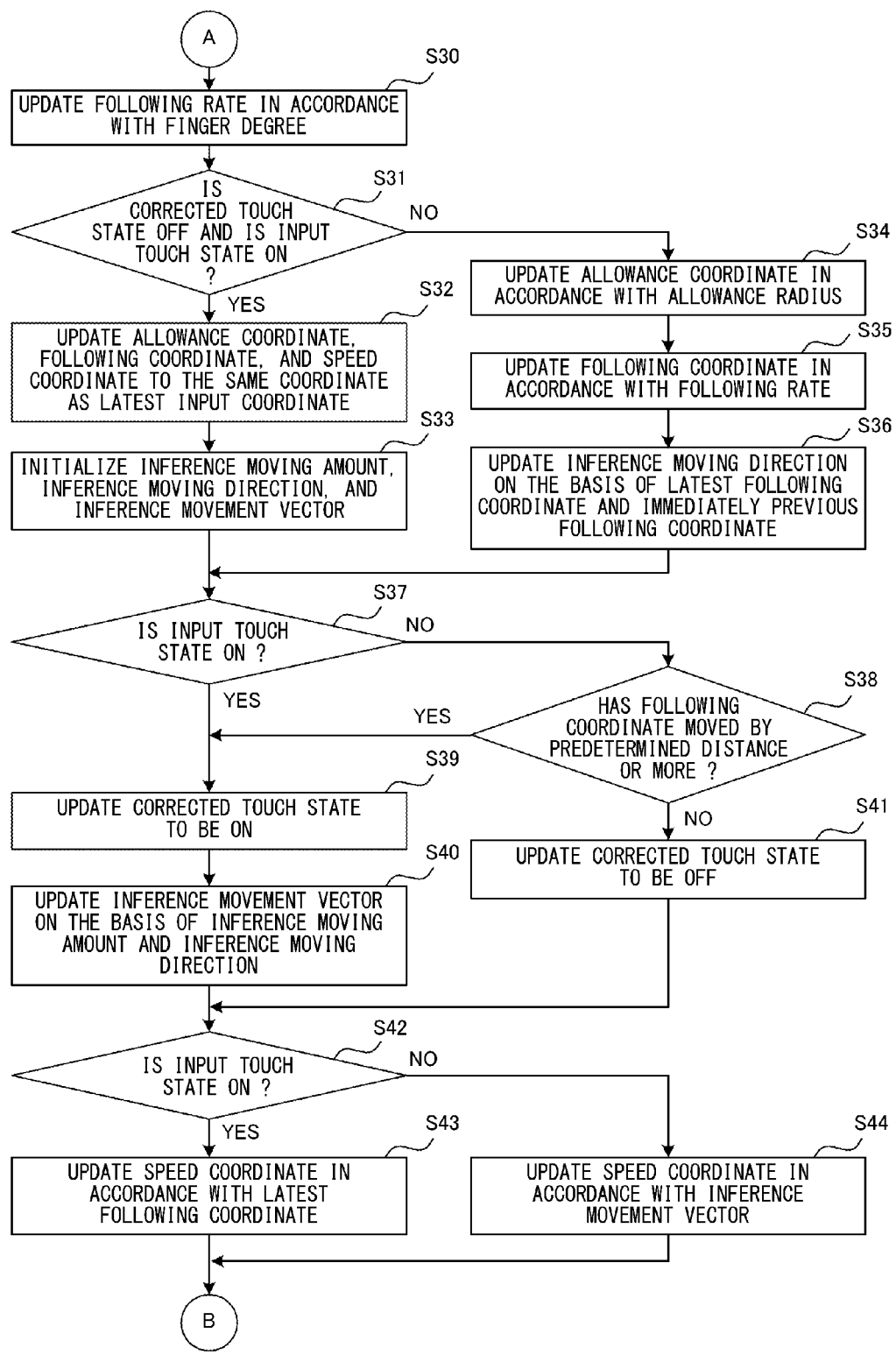
FIG. 13 is a non-limiting remaining portion of the flowchart showing the flow of the coordinate processing.
Figure 16:
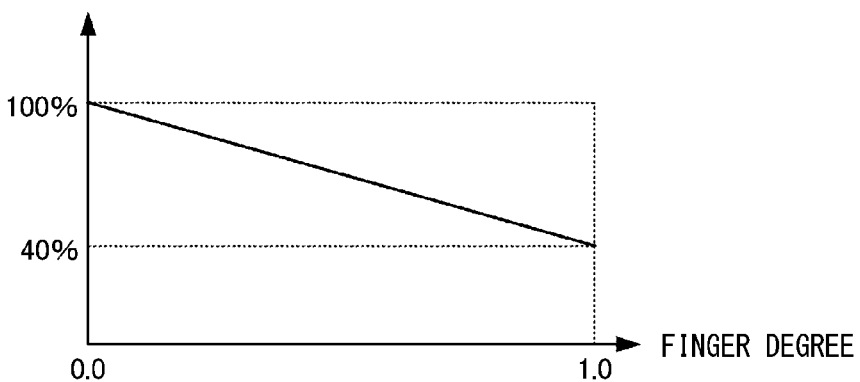
FIG. 16 is a diagram showing a non-limiting example of a method for calculating a following rate.

At step S30 in FIG. 13, the processor 18 updates the following rate D18 in accordance with the finger degree D19. Specifically, as the finger degree D19 increases (i.e., the degree of likelihood of a finger increases), the processing 18 decreases the following rate D18. For example, the processor 18 calculates the following rate D18 from the finger degree D19 by using a function shown in FIG. 16.

At step S31, the processor 18 determines whether the corrected touch state D16 is OFF (in the touch-off state) and the input touch state D12 is ON (in the touch-on state). A situation where the corrected touch state D16 is OFF and the input touch state D12 is ON means that the operator initially contacts the operation surface with the finger or the pen, or that after intentionally separating the finger or the pen from the operation surface, the operator contacts the operation surface with the finger or the pen again in order to make a new input. When a result of the determination at step S31 is positive, the processing proceeds to step S32. When the result of the determination at step S31 is negative, the processing proceeds to step S34.

At step S32, the processor 18 updates the allowance coordinate D13, the following coordinate D14, and the speed coordinate D15 to the same coordinate as the latest input coordinate D11.

At step S33, the processor 18 initializes the inference moving amount D20, the inference moving direction D21, and the inference movement vector D22. Specifically, the processor 18 initializes the inference moving amount D20 to be 0, and initializes the inference moving direction D21 and the inference movement vector D22 to be zero vectors.

At step S34, the processor 18 updates the allowance coordinate D13 in accordance with the allowance radius D17. Specifically, when the distance between the latest input coordinate and the allowance coordinate D13 is larger than the allowance radius D17, the processor 18 changes the allowance coordinate D13 so as to move the allowance coordinate D13 toward the latest input coordinate such that the distance between the latest input coordinate and the allowance coordinate D13 agrees with the allowance radius D17. It is noted that when the distance between the latest input coordinate and the allowance coordinate D13 is equal to or smaller than the allowance radius D17, the processor 18 does not change the values of the allowance coordinate D13.

At step S35, the processor 18 updates the following coordinate D14 in accordance with the following rate D18. Specifically, the processor 18 updates the following coordinate D14 such that the following coordinate D14 moves toward the allowance coordinate D13 by a distance obtained by multiplying, by the following rate D18, the distance between the following coordinate D14 and the allowance coordinate D13 updated at step S34.

At step S36, the processor 18 updates the inference moving direction D21 on the basis of the latest following coordinate and the following coordinate immediately previous to the latest following coordinate. Specifically, for example, where the inference moving direction D21 before update is V; the inference moving direction D21 after update is V'; and a vector connecting the latest following coordinate to the immediately previous following coordinate is v, it is satisfied that V'=V+(v−V)×D. D is a predetermined constant (e.g., 0.3). In another embodiment, the vector connecting the latest following coordinate to the immediately previous following coordinate may be set as the inference moving direction D21. In still another embodiment, an average (an arithmetic average, a weighted average, or the like) of the vector v1 connecting the latest following coordinate to the immediately previous following coordinate and a vector v2 connecting the immediately previous following coordinate to the following coordinate immediately previous to the last two following coordinates may be set as the inference moving direction D21.

At step S37, the processor 18 determines whether the input touch state D12 is ON. Then, when the input touch state D12 is ON, the processing proceeds to step S39. When the input touch state D12 is not ON, the processing proceeds to step S38.

At step S38, the processor 18 determines whether the following coordinate has moved by a predetermined distance or more. Specifically, for example, the processor 18 determines whether the distance between the latest following coordinate and the following coordinate immediately previous to the latest following coordinate is equal to or larger than a predetermined distance (e.g., 0.1). When it is determined that the following coordinate has moved by the predetermined distance or more, the processing proceeds to step S39. When it is not determined that the following coordinate has moved by the predetermined distance or more, the processing proceeds to step S41. It is noted that instead of determining whether the following coordinate has moved by the predetermined distance or more, the processor 18 may determine whether the following coordinate has stopped (in other words, whether the following coordinate has reached a target coordinate).

At step S39, the processor 18 updates the corrected touch state D16 to be ON (in the touch-on state). By so doing, even when the input touch state D12 is OFF, while the following coordinate moves (excluding the case where the following coordinate moves at a very low speed), it is determined that the input operation of the operator is not interrupted (i.e., interruption of the input coordinate is temporary and touching of the operator on the operation surface actually continues).

At step S40, the processor 18 updates the inference movement vector D22 on the basis of the inference moving amount D20 and the inference moving direction D21.

At step S41, the processor 18 updates the corrected touch state D16 to be OFF (in the touch-on state).

At step S42, the processor 18 determines whether the input touch state D12 is ON. Then, when the input touch state D12 is ON, the processing proceeds to step S43. When the input touch state D12 is not ON, the processing proceeds to step S44.

At step S43, the processor 18 updates the speed coordinate D15 in accordance with the latest following coordinate D14. Specifically, for example, the processor 18 counts the number of continuous times of the touch-on state of the input touch state D12. Where the number of continuous times is N (note that the upper limit is 10); the latest following coordinate D14 is F; the speed coordinate D15 before update is S; and the speed coordinate D15 after update is S', it is satisfied that S'=S+(F−S)×N/10. In other words, when the number of continuous times of the touch-on state is 0 to 9, the speed coordinate D15 approaches the following coordinate D14 so as to coincide with the following coordinate D14, and when the number of continuous times of the touch-on state is 10 or more, the speed coordinate D15 always coincides with the following coordinate D14.

At step S44, the processor 18 updates the speed coordinate D15 in accordance with the inference movement vector D22. Specifically, the processor 18 updates the speed coordinate D15 such that the speed coordinate D15 moves in the moving direction indicated by the inference movement vector D22 and by the moving amount indicated by the inference movement vector D22.

When the process at step S43 or step S44 ends, the processing returns to step S11 in FIG. 12, and the processing described above is repeated in predetermined cycles (e.g., in the same cycles as the cycles in which coordinate data is outputted from the touch panel 12).

As described above, the following coordinate D14 and the speed coordinate D15, which are updated in real time in accordance with the input coordinate data outputted from the touch panel 12, can be used for optional purposes as coordinates (corrected coordinates) resulting from compensation of fluctuation and interruption of the input coordinate. It is noted that only either one of the following coordinate D14 or the speed coordinate D15 may be used depending on a purpose. The following coordinate D14 tends to more accurately reflect the shape of a trajectory drawn by the operator as compared to the speed coordinate D15, and thus is suitable for, for example, a purpose of displaying the shape of a trajectory drawn by the operator on the screen of the display device 16. Meanwhile, the speed coordinate D15 tends to more accurately reflect a moving direction and a moving speed of the finger or the pen as compared to the following coordinate D14, and thus is suitable, for example, for a purpose of moving an object displayed on the screen of the display device 16, such as a character, an icon, or a window, in accordance with a moving direction and a moving speed of the finger or the pen.

Similarly to the following coordinate D14 and the speed coordinate D15, other data (such as the allowance coordinate D13, the corrected touch state D16, the finger degree D19, and the inference movement vector D22), which is updated in real time in accordance with the input coordinate data outputted from the touch panel 12, can also be used for optional purposes. For example, when the touch panel 12 is provided on the screen of the display device 16, the size of an icon, a menu button, a hand-writing input box, or the like displayed on the screen may be changed in response to the finger degree D19. For example, by increasing their sizes as the finger degree D19 increases, when an operation is performed with the finger, the operability improves, and when an operation is performed with the pen, an amount of information which can be displayed on the screen is increased and the limited display area can be effectively used. In addition, similarly to the speed coordinate D15, the inference movement vector D22 is suitable for a purpose of moving an object displayed on the screen of the display device 16, such as a character, an icon, or a window, in accordance with a moving direction and a moving speed of the finger or the pen.

The exemplary embodiment described above is merely one embodiment, and various modifications are considered.

Figure 17:
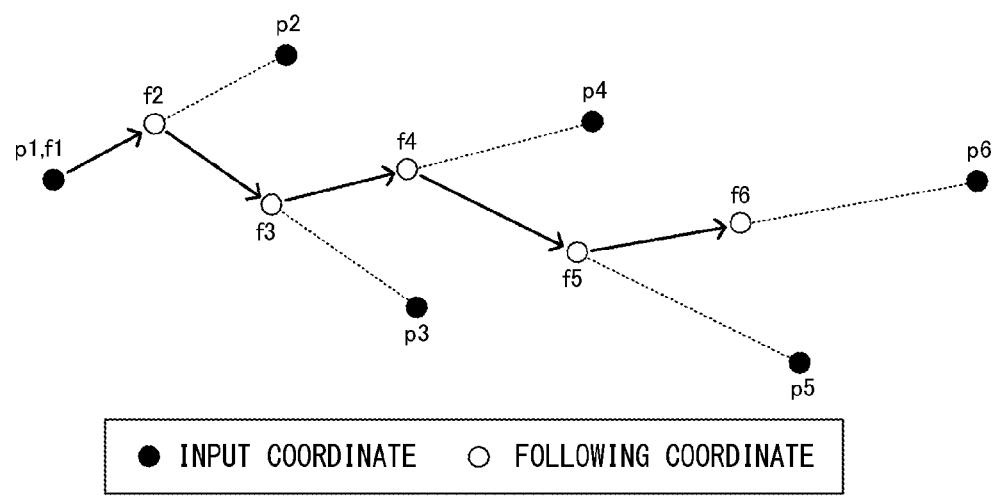
FIG. 17 is a diagram showing a non-limiting modification of a method for setting a following coordinate.

For example, in the exemplary embodiment described above, the following coordinate D14 is updated so as to follow the allowance coordinate D13 as a target coordinate. However, in another embodiment, as shown in FIG. 17, the following coordinate D14 may be updated so as to follow the input coordinate D11 as a target coordinate, without using the allowance coordinate D13. In this case as well, in FIG. 17, an input trajectory represented by following coordinates f1 to f6 is smoother than the input trajectory represented by input coordinates p1 to p6, and fluctuation of the coordinate is suppressed.

Figure 18:
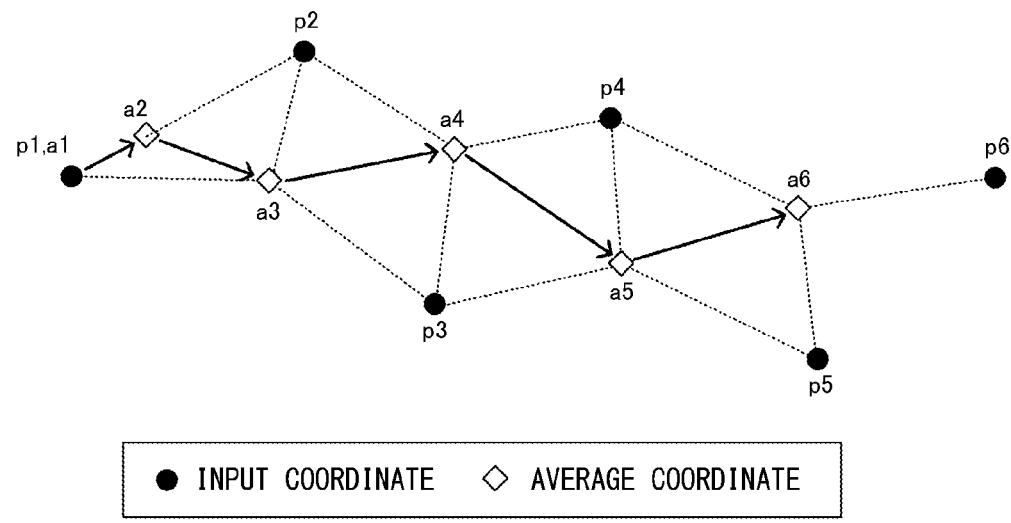
FIG. 18 is a diagram showing a non-limiting modification of a method for correcting an input coordinate.

Further, in the exemplary embodiment described above, fluctuation of the coordinate is compensated for by using the following coordinate D14. However, in another embodiment, fluctuation of the coordinate may be compensated for by using only the allowance coordinate D13, or by using another compensation method. For example, as shown in FIG. 18, fluctuation of the coordinate may be compensated for by using an average coordinate obtained by averaging the last three input coordinates. For example, in FIG. 18, an average coordinate a3 is a coordinate obtained by averaging input coordinates p1 to p3, and an average coordinate a4 is a coordinate obtained by averaging the input coordinates p2 to p4. In this case, by changing the number of input coordinates which are to be averaged, a degree of compensating for fluctuation of the coordinate (i.e., responsiveness to variation of a contact position) can be changed. Thus, for example, by setting the number of input coordinates, which are to be averaged, to 1 when the finger degree D19 is 0, and increasing the number of input coordinates, which are to be averaged, as the finger degree D19 increases, an effect similar to that in the exemplary embodiment described above is obtained.

Further, in the exemplary embodiment described above, whether touching of the operator on the operation surface continues is determined on the basis of the moving amount (the moving amount per unit time) of the following coordinate, and interruption of the coordinate is compensated for (i.e., a coordinate which is to be originally inputted is complemented). However, in another embodiment, whether touching of the operator on the operation surface continues may be determined on the basis of an elapsed time from interruption of the input coordinate. For example, until the elapsed time from interruption of the input coordinate exceeds a predetermined reference time, it may be determined that touching of the operator on the operation surface continues, and when the elapsed time exceeds the predetermined reference time, it may be determined that the touching of the operator on the operation surface has ended. In addition, the reference time may be changed in real time in response to the finger degree D19 or the inference moving amount D20. For example, by setting the reference time to 0 when the finger degree D19 is 0 and increasing the reference time as the finger degree D19 increases, an effect similar to that in the exemplary embodiment described above is obtained. In addition, interruption of the coordinate is likely to occur when the operator quickly moves the finger, and thus, for example, by setting the reference time to 0 when the inference moving amount D20 (i.e., the value obtained by inferring the actual moving amount of the finger of the operator) is 0 and increasing the reference time as the inference moving amount D20 increases, an effect similar to that in the exemplary embodiment described above is obtained.

Further, in the exemplary embodiment described above, the degree of correcting a coordinate is adjusted by using the finger degree D19. However, in another embodiment, whether the operator performs an operation with the finger or the pen may be determined by making a choice between these two choices, and the degree of correcting a coordinate may be changed between two levels in accordance with a result of the determination. For example, when it is determined that the operator performs an operation with the finger, coordinate correction may be performed, and when the operator performs an operation with the pen, coordinate correction may not be performed.

Further, in the exemplary embodiment described above, the finger degree D19 is updated on the basis of the shape of the input trajectory represented by the input coordinates, the continuous contact time, and the continuous non-contact time, but the method for updating the finger degree D19 is not limited thereto. For example, when a touch panel which is capable of detecting a contact area with an operation surface thereof is used, the finger degree D19 may be updated in real time in accordance with the detected contact area. For example, as the detected contact area increases, the finger degree D19 may be increased.

Further, in the exemplary embodiment described above, whether the operator performs an operation with the finger or the pen is determined on the basis of the characteristic of the input coordinate data outputted from the touch panel 12. However, in another embodiment, the operator may previously designate whether to perform an operation with the finger or the pen, by using any input device. Then, the degree of correcting a coordinate may be changed between two levels when an operation with the finger is designated and when an operation with the pen is designated.

Further, instead of the coordinate processing system 10 shown in FIG. 1, an information processing apparatus including the touch panel 12, such as a hand-held game apparatus, thin client, portable computer, or monitor including a touch panel, may be used.

Further, instead of the pressure-sensitive type touch panel 12, another type of touch panel (a capacitance type touch panel) may be used. However, for example, in a capacitance type touch panel, fluctuation and interruption of the input coordinate which occur when an operation is performed with the finger do not remarkably appear as in a pressure-sensitive type touch panel. When a capacitance type touch panel is used, whether the operator performs an operation with the finger or the pen may be determined on the basis of a contact area with an operation surface.

Further, instead of the touch panel 12, any coordinate input device having the same function as that of a touch panel, such as a touch pad, (i.e., a coordinate input device which is capable of detecting a contact position of a finger or a pen with respect to an operation surface thereof) may be used.

Further, in the exemplary embodiment described above, a plurality of the processes shown in FIGS. 12 and 13 is executed by a single computer (the processor 18). However, in another embodiment, a plurality of computers may share the execution of these processes. In still another embodiment, some or all of these processes may be realized by a dedicated circuit.

Further, in the exemplary embodiment described above, a plurality of the processes shown in FIGS. 12 and 13 is executed in the single information processing apparatus 14. However, in another embodiment, a plurality of information processing apparatuses may share the execution of these processes.

Further, in the exemplary embodiment described above, the coordinate processing program D10 is loaded from the internal storage unit 20 or the external storage unit 24 into the main memory 22. However, in another embodiment, the coordinate processing program D10 may be supplied from another information processing apparatus (e.g., a server) to the information processing apparatus 14.

While the technology has been described in detail, the foregoing description is in all aspects illustrative and not restrictive. It will be understood that numerous other modifications and variations can be devised without departing from the scope of the technology.

What is claimed is:

1. A non-transitory computer-readable storage medium having stored therein a coordinate processing program for processing input coordinate data outputted from a coordinate input device, the coordinate processing program causing a computer to operate as:

a second coordinate series calculator configured to calculate, on the basis of a first coordinate series indicated by the input coordinate data, a second coordinate series which represents an input trajectory having a shape smoother than a shape of an input trajectory represented by the first coordinate series;

a moving amount calculator configured to calculate a moving amount of a coordinate on the basis of the first coordinate series;

a moving direction calculator configured to calculate a moving direction of the coordinate on the basis of the second coordinate series; and a processing section configured to perform predetermined processing by using the moving amount calculated by the moving amount calculator and the moving direction calculated by the moving direction calculator, wherein the moving direction calculator calculates the moving direction on the basis of a direction of a straight line connecting a latest coordinate of the second coordinate series to a coordinate immediately previous to the latest coordinate.

2. The non-transitory computer-readable storage medium according to claim 1, wherein the moving amount calculator calculates the moving amount on the basis of at least a distance between a latest coordinate of the first coordinate series and a coordinate immediately previous to the latest coordinate.

3. A non-transitory computer-readable storage medium having stored therein a coordinate processing program for processing input coordinate data outputted from a coordinate input device, the coordinate processing program causing a computer to operate as:

a second coordinate series calculator configured to calculate, on the basis of a first coordinate series indicated by the input coordinate data, a second coordinate series which represents an input trajectory having a shape smoother than a shape of an input trajectory represented by the first coordinate series;

a moving amount calculator configured to calculate a moving amount of a coordinate on the basis of the first coordinate series;

a moving direction calculator configured to calculate a moving direction of the coordinate on the basis of the second coordinate series; and a processing section configured to perform predetermined processing by using the moving amount calculated by the moving amount calculator and the moving direction calculated by the moving direction calculator, wherein the second coordinate series calculator calculates, as a coordinate of the second coordinate series, a following coordinate which follows a target coordinate which is set on the basis of the input coordinate data.

4. The non-transitory computer-readable storage medium according to claim 3, wherein the second coordinate series calculator calculates, as a coordinate of the second coordinate series, a following coordinate which follows the target coordinate at a predetermined rate.

5. The non-transitory computer-readable storage medium according to claim 3, wherein the second coordinate series calculator updates the following coordinate at all times such that the following coordinate approaches the target coordinate by a predetermined rate of a distance from the following coordinate to the target coordinate.

6. The non-transitory computer-readable storage medium according to claim 3, wherein the target coordinate is an allowance coordinate which, when being distant from an input coordinate indicated by the input coordinate data by more than a predetermined distance, moves toward the input coordinate so as to be located at a position away from the input coordinate by the predetermined distance.

7. A non-transitory computer-readable storage medium having stored therein a coordinate processing program for processing input coordinate data outputted from a coordinate input device, the coordinate processing program causing a computer to operate as:

a second coordinate series calculator configured to calculate, on the basis of a first coordinate series indicated by the input coordinate data, a second coordinate series which represents an input trajectory having a shape smoother than a shape of an input trajectory represented by the first coordinate series;

a moving amount calculator configured to calculate a moving amount of a coordinate on the basis of the first coordinate series;

a moving direction calculator configured to calculate a moving direction of the coordinate on the basis of the second coordinate series; and a processing section configured to perform predetermined processing by using the moving amount calculated by the moving amount calculator and the moving direction calculated by the moving direction calculator, wherein the processing section includes a movement vector generator configured to generate a movement vector indicating a moving amount and a moving direction of a coordinate, by using the moving amount calculated by the moving amount calculator and the moving direction calculated by the moving direction calculator.

8. The non-transitory computer-readable storage medium according to claim 7, wherein the processing section includes a third coordinate series calculator configured to calculate a third coordinate series by using the moving amount calculated by the moving amount calculator and the moving direction calculated by the moving direction calculator.

9. The non-transitory computer-readable storage medium according to claim 7, wherein the processing section includes a coordinate complementation section configured to complement the input coordinate data by using the moving amount calculated by the moving amount calculator and the moving direction calculated by the moving direction calculator, when output of the input coordinate data from the coordinate input device is temporarily interrupted.

10. The non-transitory computer-readable storage medium according to claim 1, wherein the processing section performs the predetermined processing in real time in accordance with output of the input coordinate data from the coordinate input device.

11. A coordinate processing apparatus for processing input coordinate data outputted from a coordinate input device, the coordinate processing apparatus comprising:

a second coordinate series calculator configured to calculate, on the basis of a first coordinate series indicated by the input coordinate data, a second coordinate series which represents an input trajectory having a shape smoother than a shape of an input trajectory represented by the first coordinate series;

a moving amount calculator configured to calculate a moving amount of a coordinate on the basis of the first coordinate series;

a moving direction calculator configured to calculate a moving direction of the coordinate on the basis of the second coordinate series; and a processing section configured to perform predetermined processing by using the moving amount calculated by the moving amount calculator and the moving direction calculated by the moving direction calculator, wherein the moving direction calculator is further configured to calculate the moving direction on the basis of a direction of a straight line connecting a latest coordinate of the second coordinate series to a coordinate immediately previous to the latest coordinate.

12. A coordinate processing system for processing input coordinate data outputted from a coordinate input device, the coordinate processing system comprising:

a second coordinate series calculator configured to calculate, on the basis of a first coordinate series indicated by the input coordinate data, a second coordinate series which represents an input trajectory having a shape smoother than a shape of an input trajectory represented by the first coordinate series;

a moving amount calculator configured to calculate a moving amount of a coordinate on the basis of the first coordinate series;

a moving direction calculator configured to calculate a moving direction of the coordinate on the basis of the second coordinate series; and a processing section configured to perform predetermined processing by using the moving amount calculated by the moving amount calculator and the moving direction calculated by the moving direction calculator, wherein the moving direction calculator is further configured to calculate the moving direction on the basis of a direction of a straight line connecting a latest coordinate of the second coordinate series to a coordinate immediately previous to the latest coordinate.

13. A coordinate processing apparatus for processing input coordinate data outputted from a coordinate input device, the coordinate processing apparatus comprising:

processing resources that include at least one processor;

a second coordinate series calculator configured to calculate, by using the processing resources and on the basis of a first coordinate series indicated by the input coordinate data, a second coordinate series which represents an input trajectory having a shape smoother than a shape of an input trajectory represented by the first coordinate series;

a moving amount calculator configured to calculate, by using the processing resources, a moving amount of a coordinate on the basis of the first coordinate series;

a moving direction calculator configured to calculate, by using the processing resources, a moving direction of the coordinate on the basis of the second coordinate series; and a processing section configured to perform, by using the processing resources, predetermined processing by using the moving amount calculated by the moving amount calculator and the moving direction calculated by the moving direction calculator, wherein the second coordinate series is further configured to calculate, as a coordinate of the second coordinate series, a following coordinate which follows a target coordinate which is set on the basis of the input coordinate data.

14. A coordinate processing system for processing input coordinate data outputted from a coordinate input device, the coordinate processing system comprising:

at least one processor;

a second coordinate series calculator configured to, by using the at least one processor calculate, on the basis of a first coordinate series indicated by the input coordinate data, a second coordinate series which represents an input trajectory having a shape smoother than a shape of an input trajectory represented by the first coordinate series;

a moving amount calculator configured to, by using the at least one processor, calculate a moving amount of a coordinate on the basis of the first coordinate series;

a moving direction calculator configured to, by using the at least one processor, calculate a moving direction of the coordinate on the basis of the second coordinate series; and a processing section configured to, by using the at least one processor, perform predetermined processing by using the moving amount calculated by the moving amount calculator and the moving direction calculated by the moving direction calculator, wherein the second coordinate series calculator is further configured to calculate, as a coordinate of the second coordinate series, a following coordinate which follows a target coordinate which is set on the basis of the input coordinate data.

15. A coordinate processing apparatus for processing input coordinate data outputted from a coordinate input device, the coordinate processing apparatus comprising:

a second coordinate series calculator configured to calculate, on the basis of a first coordinate series indicated by the input coordinate data, a second coordinate series which represents an input trajectory having a shape smoother than a shape of an input trajectory represented by the first coordinate series;

a moving amount calculator configured to calculate a moving amount of a coordinate on the basis of the first coordinate series;

a moving direction calculator configured to calculate a moving direction of the coordinate on the basis of the second coordinate series; and a processing section configured to perform predetermined processing by using the moving amount calculated by the moving amount calculator and the moving direction calculated by the moving direction calculator, wherein the processing section includes a movement vector generator configured to generate a movement vector indicating a moving amount and a moving direction of a coordinate, by using the moving amount calculated by the moving amount calculator and the moving direction calculated by the moving direction calculator.

16. A coordinate processing system for processing input coordinate data outputted from a coordinate input device, the coordinate processing system comprising:

a second coordinate series calculator configured to calculate, on the basis of a first coordinate series indicated by the input coordinate data, a second coordinate series which represents an input trajectory having a shape smoother than a shape of an input trajectory represented by the first coordinate series;

a moving amount calculator configured to calculate a moving amount of a coordinate on the basis of the first coordinate series;

a moving direction calculator configured to calculate a moving direction of the coordinate on the basis of the second coordinate series; and a processing section configured to perform predetermined processing by using the moving amount calculated by the moving amount calculator and the moving direction calculated by the moving direction calculator, wherein the processing section includes a movement vector generator configured to generate a movement vector indicating a moving amount and a moving direction of a coordinate, by using the moving amount calculated by the moving amount calculator and the moving direction calculated by the moving direction calculator.

* * * * *